(12) United States Patent
Savard et al.

(10) Patent No.: US 10,956,859 B2
(45) Date of Patent: Mar. 23, 2021

(54) AVOIDANCE OF PRODUCT STOCKOUTS THROUGH OPTIMIZED ROUTING OF ONLINE ORDERS

(71) Applicant: International Business Machines Corporation, Armonk, NY (US)

(72) Inventors: France Savard, Montreal (CA); Xiaowei Bao, Denver, CO (US); Emrah Zarifoglu, San Mateo, CA (US); Pavel Zelinsky, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 15/995,272

(22) Filed: Jun. 1, 2018

(65) Prior Publication Data
US 2019/0370734 A1    Dec. 5, 2019

(51) Int. Cl.
*G06Q 10/08* (2012.01)
*G06Q 30/02* (2012.01)
*G06Q 30/06* (2012.01)

(52) U.S. Cl.
CPC ..... *G06Q 10/087* (2013.01); *G06Q 10/08345* (2013.01); *G06Q 30/0202* (2013.01); *G06Q 30/0635* (2013.01)

(58) Field of Classification Search
CPC ........ G06Q 10/00; G06Q 10/06; G06Q 10/08; G06Q 30/06; G06Q 30/00; G06Q 30/02; G06N 5/04; G06N 99/00; G06N 7/00
USPC ..... 705/14.49, 26.7, 27.1, 14.23, 37, 15, 29, 705/400, 28, 7.22, 7.25
See application file for complete search history.

(56) References Cited

U.S. PATENT DOCUMENTS

| | | | |
|---|---|---|---|
| 5,608,621 A | 3/1997 | Caveney et al. | |
| 5,946,662 A | 8/1999 | Ettl et al. | |
| 8,732,039 B1 | 5/2014 | Chen et al. | |
| 9,195,959 B1 * | 11/2015 | Lopez | G06Q 10/087 |
| 9,865,010 B2 | 1/2018 | Borders et al. | |
| 2001/0047293 A1 | 11/2001 | Waller et al. | |

(Continued)

OTHER PUBLICATIONS

Business Wire, "DSW Selects VendorNet as Its Omnichannel Technology Partner," https://www.businesswire.com/news/home/20130109005301/en, Jan. 9, 2013, pp. 1-2.

(Continued)

*Primary Examiner* — Olusegun Goyea
(74) *Attorney, Agent, or Firm* — Robert A. Voigt, Jr.; Winstead PC (57) ABSTRACT

A method, system and computer program product for fulfilling an online order. An online order to purchase an item(s) is received. The "candidate locations" that stock the item(s) of the online order and that can be used to fulfill at least a portion of the online order are determined. A stockout cost for each of these candidate locations for fulfilling an item of the online order may be calculated, where the stockout cost is a cost of a potential lost sale of the item of the online order by the candidate location if the candidate location fulfills the item of the online order. A shipping location among the candidate locations to fulfill the item is then determined based at least in part on the stockout cost for each of the candidate locations for fulfilling the item. The item is then shipped to the customer from the determined shipping location.

20 Claims, 5 Drawing Sheets

(56) References Cited

U.S. PATENT DOCUMENTS

| | | | |
|---|---|---|---|
| 2002/0035537 A1* | 3/2002 | Waller | G06Q 40/04 705/37 |
| 2007/0185778 A1 | 8/2007 | Weng | |
| 2008/0027836 A1* | 1/2008 | Chapin | G06Q 10/087 705/28 |
| 2010/0262521 A1* | 10/2010 | Robinson | G06Q 10/08 705/29 |
| 2012/0054076 A1* | 3/2012 | Wu | G06Q 10/087 705/28 |
| 2012/0221393 A1* | 8/2012 | Ouimet | G06Q 30/0239 705/14.23 |
| 2012/0253908 A1* | 10/2012 | Ouimet | G06Q 30/02 705/14.23 |
| 2013/0151381 A1* | 6/2013 | Klein | G06Q 30/0641 705/27.1 |
| 2013/0317921 A1* | 11/2013 | Havas | G06Q 20/405 705/15 |
| 2013/0325551 A1 | 12/2013 | Rosenberg | |
| 2014/0058781 A1* | 2/2014 | Padmanabhan | G06Q 30/0202 705/7.22 |
| 2014/0156392 A1* | 6/2014 | Ouimet | G06Q 30/0633 705/14.49 |
| 2014/0279294 A1 | 9/2014 | Field-Darragh et al. | |
| 2015/0254589 A1* | 9/2015 | Saxena | G06Q 10/087 705/7.25 |
| 2016/0071190 A1 | 3/2016 | Voelz et al. | |
| 2017/0011449 A1* | 1/2017 | Mueller | G06Q 30/0635 |
| 2017/0206589 A1* | 7/2017 | Deshpande | G06F 3/0482 |
| 2017/0213174 A1* | 7/2017 | Deshpande | G06Q 10/0633 |
| 2017/0228812 A1* | 8/2017 | Brereton | G06Q 30/0635 |
| 2017/0286899 A1* | 10/2017 | Deshpande | G06Q 10/087 |
| 2017/0330123 A1* | 11/2017 | Deshpande | G06Q 10/0837 |
| 2017/0330124 A1* | 11/2017 | Deshpande | G06Q 10/06315 |
| 2017/0330211 A1* | 11/2017 | Deshpande | G06Q 10/087 |
| 2017/0330218 A1* | 11/2017 | Deshpande | G06Q 30/0635 |
| 2017/0330259 A1* | 11/2017 | Deshpande | G06Q 30/0625 |
| 2017/0330266 A1* | 11/2017 | Deshpande | G06Q 30/0635 |
| 2018/0005171 A1* | 1/2018 | Harsha | G06Q 30/0201 |
| 2018/0218314 A1* | 8/2018 | Bowman | G06Q 10/087 |
| 2018/0218322 A1* | 8/2018 | Bhargava | G06Q 30/0633 |

OTHER PUBLICATIONS

IBM, "IBM Watson Order Optimizer," claimed invention was embodied in product IBM Watson Order Optimizer that was released on Jun. 29, 2017, Brochure of product IBM Watson Order Optimizer, two pages, Grace Period Disclosure.

* cited by examiner

AVOIDANCE OF PRODUCT STOCKOUTS THROUGH OPTIMIZED ROUTING OF ONLINE ORDERS

TECHNICAL FIELD

The present invention relates generally to order fulfillment, and more particularly to avoiding product stockouts through optimized routing of online orders.

BACKGROUND

More and more, Internet users are realizing the ease and convenience of ordering online for a variety of needed goods. Being able to fulfill these orders (online orders) by the seller is important for the seller to operate a successful business. As a result, the inventory or stock of the goods to be sold is important.

If a business has too much inventory on hand at a given location, then the business is wasting capital. If, however, the business has too little inventory, then they are unable to fulfill customers' orders and lose sales from "stockouts" to competitors. A stockout refers to the situation when the inventory for a particular item (e.g., Fisher-Price® Thomas & Friends® Super Station®) is exhausted.

Avoiding stockouts is very important to the business not only because of lost sales but also for maintaining their relationships with customers. Historically, sellers have tried to avoid stockouts through supply chain optimization by ensuring that there was adequate inventory in stores to fulfill orders from that store. Online orders are generally fulfilled from a regional distribution center. Hence, current supply chain systems focus primarily on serving each fulfillment channel (physical store and distribution center) separately. The supply chain systems try to optimize the level of inventory in each channel separately using separate forecasts for consumer demand. As a result, the individual physical stores can run out of stock of an item (i.e., experience a stockout for an item) if demand forecasts are inaccurate thereby resulting in lost sales for that store even if stores nearby still have the item on the shelf.

Furthermore, distribution centers can also run out of stock of an item (i.e., experience a stockout for an item) forcing the retailer to either lose the sale or potentially pay significantly higher shipping and handling costs to fulfill the order from another distribution center in another region. Demand for many products is very hard to predict at a store-product level or at a store-distribution center level, especially for seasonal items or during special events, such as Black Friday or other promotional events.

Hence, there is not currently a means for efficiently fulfilling online orders utilizing both distribution centers and store inventories. Furthermore, there is not currently a means for avoiding stockouts in connection with fulfilling online orders utilizing both distribution centers and store inventories.

SUMMARY

In one embodiment of the present invention, a method for fulfilling an online order comprises receiving the online order to purchase one or more items. The method further comprises determining candidate locations that stock one or more of the one or more items and can be used for fulfill at least a portion of the online order, where at least one of the candidate locations comprises a retail store. The method additionally comprises calculating a stockout cost for each of the candidate locations for fulfilling an item of the online order, where the stockout cost is a cost of a potential lost sale of the item of the online order by the candidate location if the candidate location fulfills the item of the online order. Furthermore, the method comprises determining a shipping location among the candidate locations to fulfill the item of the online order based at least in part on the stockout cost for each of the candidate locations for fulfilling the item of the online order. Additionally, the method comprises issuing an order to ship the item to a customer from the determined shipping location.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for fulfilling an online order. In one embodiment of the present invention, an online order to purchase one or more items (e.g., a pack of eighteen tennis balls) is received. The "candidate locations" that stock the item(s) of the online order and that can be used to fulfill at least a portion of the online order are determined. In one embodiment, an online order analyzer has access to a database that stores the physical location of the distribution centers and retail stores as well as the list of items that are currently being sold in such locations (real-time inventory). Such information may be used by the online order analyzer to determine which locations stock the item(s) of the online order as well as which ones can be used to fulfill at least a portion of the online order based on the physical location of the distribution centers/retail stores with respect to the location of the customer, which may be directly provided by the customer (via a computing device) or deduced via the Internet Protocol (IP) address of the computing device utilized by the customer. A stockout cost for each of these candidate locations for fulfilling an item of the online order may be calculated, where the stockout cost is a cost of a potential lost sale of the item of the online order by the location (e.g., retail store) if the location fulfills the item of the online order. A shipping location among the candidate locations to fulfill the item of the online order is then determined based at least in part on the stockout cost for each of the candidate locations for fulfilling the item of the online order. The item is then shipped to the customer from the determined shipping location. In this manner, by utilizing the stockout cost, online orders may be optimally routed to either distribution centers or physical stores for fulfillment so as to minimize or avoid product stockouts.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
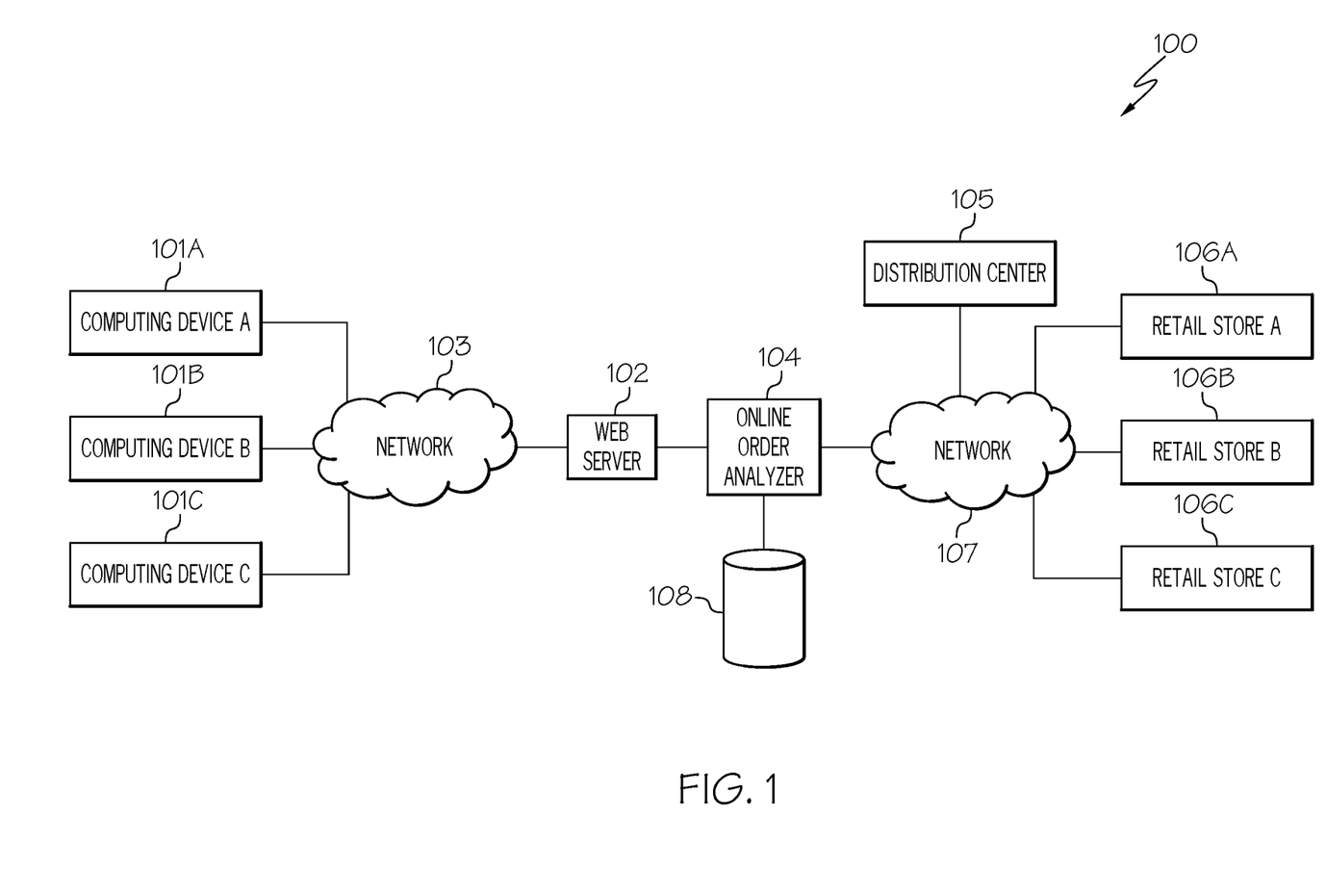
FIG. 1 illustrates an online ordering system for practicing the principles of the present invention in accordance with an embodiment of the present invention.

Referring now to the Figures in detail, FIG. 1 illustrates an embodiment of the present invention of an online ordering system 100 for practicing the principles of the present invention in accordance with an embodiment of the present invention. System 100 includes computing devices 101A-101C (identified as "Computing Device A," "Computing Device B," and "Computing Device C," respectively, in FIG. 1) connected to a web server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, laptop computer, smartphone, mobile phone, navigation device, gaming unit, desktop computer system, workstation, Internet appliance and the like) configured with the capability of connecting to network 103 and consequently communicating with other computing devices 101 and web server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Web server 102 is configured to receive order requests (online orders) from users 101 for the purchase of one or more items sold by a business on a website hosted by web server 102.

In one embodiment, such online orders are analyzed by a mechanism referred to herein as the "online order analyzer" 104 connected to web server 102. In one embodiment, online order analyzer 104 is configured to analyze the online order and determine which location(s) are to fulfill which item(s) of the online order taking into consideration what is referred to herein as the "stockout cost." The "stockout cost," as used herein, refers to the cost of a potential lost sale of an item by a location, such as a retail store, if the location fulfills the item of the online order. Such a cost is based at least in part on the likelihood that the location would make a future sale of the item. A more detailed description of online order analyzer 104 utilizing the stockout cost to determine which location (e.g., retail store, distribution center) to fulfill an item(s) from an online order is provided further below. A description of an embodiment of a hardware configuration of online order analyzer 104 is provided below in connection with FIG. 2.

Referring again to FIG. 1, system 100 further illustrates that online order analyzer 104 is connected to a distribution center 105 (computing devices of distribution center 105) and retail stores 106A-106C (computing devices of retail stores 106A-106C) (identified as "Retail Store A," "Retail Store B," and "Retail Store C," respectively, in FIG. 1) via a network 107. Retail stores 106A-106C may collectively or individually be referred to as retail stores 106 or retail store 106, respectively. A "distribution center," as used herein, refers to a warehouse or other specialized building which is stocked with products or goods to be redistributed to retailers, wholesalers or directly to customers. A "retail store," as used herein, refers to a physical building or other structure that contains products or goods to be sold to customers. As discussed above, online order analyzer 104 is connected to the computing devices (e.g., servers) of distribution center 105 and retail stores 106. Such computing devices may or may not be located on the premises of distribution centers 105/retail stores 106; however, such computing devices store information pertaining to such distribution centers 105/retail stores 106.

Furthermore, as shown in FIG. 1, system 100 includes a database 108 connected to online order analyzer 104. In one embodiment, database 108 is configured to store the physical location of distribution centers 105 and retail stores 106 as well as the list of items that are currently being sold in such locations (real-time inventory).

As discussed above, stockouts may occur at both distribution center 105 and retail stores 106 in attempting to fulfill online orders. Embodiments of the present invention attempt to avoid stockouts by optimally routing the orders to either distribution center 105 or a retail store 106 for fulfillment based on understanding the demand across both channels at the same time. When an online order is received, it can be routed by online order analyzer 104 to either distribution center 105 or an individual retail store 106 for fulfillment based on the current inventory and the predicted demand across the entire network of distribution centers 105 and retail stores 106. Individual stores 106 can ship items to online consumers 101 at a slightly higher cost than a distribution center 105, but this cost may be less than the cost of a lost sale. It is cheaper than cross shipping items for fulfillment across the supply chain network.

Being able to efficiently fulfill an online order for an item available at multiple retail stores or distribution centers can be challenging for several reasons. Simply assigning an online order to the closest store without taking into account the demand at this particular store could result in stockouts and loss sales for that store. The online order routing system needs to be able to consider situations where an item purchased online could also be desired to be purchased by an in-store customer and propose the best solution given the impact of assigning the order to a specific store versus another store or distribution center.

Embodiments of the present invention take into consideration such situations using the "stockout cost" as discussed above in determining which location should fulfill at least a portion of the online order.

Additionally, online orders themselves tend to be more complex than purchases made in stores. Consumers now have several options in terms of shipping methods and priority, which items are shipped together, which carriers are used, all at different price points with different fulfillment expectations. An online order fulfillment system needs to take all of these factors into account in real time when deciding how to route a given order for fulfillment.

Embodiments of online order fulfillment system 100 takes into account all of these factors in real time when deciding how to route a given order for fulfillment as discussed further below.

System 100 is not to be limited in scope to any one particular network architecture. System 100 may include any number of computing devices 101, web servers 102, networks 103, online order analyzers 104, distribution centers 105, retail stores 106, networks 107 and databases 108. Furthermore, the components of system 100 may or may not be connected with one another as shown in FIG. 1. For example, online order analyzer 104 may be connected to web server 102 via a network that is not shown in FIG. 1. Furthermore, while FIG. 1 illustrates online order analyzer 104 as being a separate physical device, some or all of the functionality of online order analyzer 104 may reside in web server 102.

Figure 2:
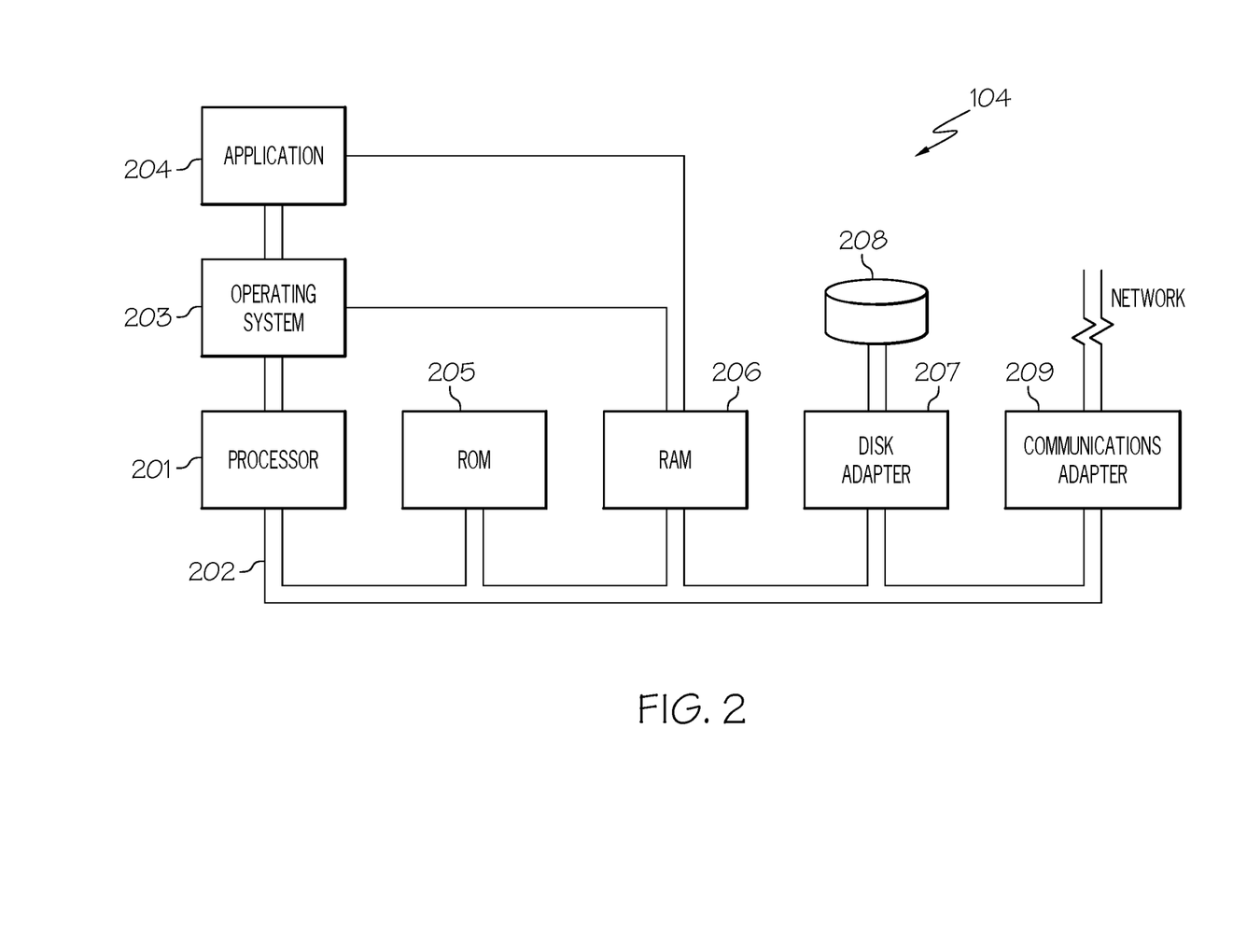
FIG. 2 illustrates an embodiment of the present invention of a hardware configuration of an online order analyzer which is representative of a hardware environment for practicing the present invention.

Referring now to FIG. 2, FIG. 2 illustrates a hardware configuration of online order analyzer 104 (FIG. 1) which is representative of a hardware environment for practicing the present invention. Referring to FIG. 2, online order analyzer 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for avoiding product stockouts through optimized routing of online orders as discussed below in association with FIGS. 3-5.

Referring again to FIG. 2, read-only memory ("ROM") 205 is coupled to system bus 202 and includes a basic input/output system ("BIOS") that controls certain basic functions of online order analyzer 104. Random access memory ("RAM") 206 and disk adapter 207 are also coupled to system bus 202. It should be noted that software components including operating system 203 and application 204 may be loaded into RAM 206, which may be online order analyzer's 104 main memory for execution. Disk adapter 207 may be an integrated drive electronics ("IDE") adapter that communicates with a disk unit 208, e.g., disk drive. It is noted that the program for avoiding product stockouts through optimized routing of online orders, as discussed below in association with FIGS. 3-5, may reside in disk unit 208 or in application 204.

Online order analyzer 104 may further include a communications adapter 209 coupled to bus 202. Communications adapter 209 interconnects bus 202 with an outside network thereby allowing online order analyzer 104 to communicate with other devices (e.g., web server 102).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, avoiding stockouts is very important to the business not only because of lost sales but also for maintaining their relationships with customers. Historically, sellers have tried to avoid stockouts through supply chain optimization by ensuring that there was adequate inventory in stores to fulfill orders from that store. Online orders are generally fulfilled from a regional distribution center. Hence, current supply chain systems focus primarily on serving each fulfillment channel (physical store and distribution center) separately. The supply chain systems try to optimize the level of inventory in each channel separately using separate forecasts for consumer demand. As a result, the individual physical stores can run out of stock of an item (i.e., experience a stockout for an item) if demand forecasts are inaccurate thereby resulting in lost sales for that store even if stores nearby still have the item on the shelf. Furthermore, distribution centers can also run out of stock of an item (i.e., experience a stockout for an item) forcing the retailer to either lose the sale or potentially pay significantly higher shipping and handling costs to fulfill the order from another distribution center in another region. Demand for many products is very hard to predict at a store-product level or at a store-distribution center level, especially for seasonal items or during special events, such as Black Friday or other promotional events. Hence, there is not currently a means for efficiently fulfilling online orders utilizing both distribution centers and store inventories. Furthermore, there is not currently a means for avoiding stockouts in connection with fulfilling online orders utilizing both distribution centers and store inventories.

Figure 3:
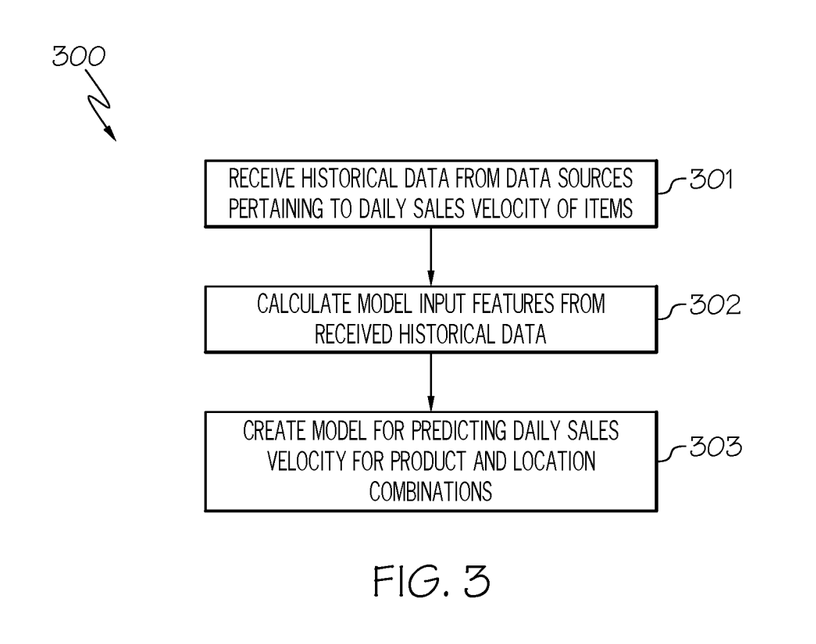
FIG. 3 is a flowchart of a method for creating a model for predicating the daily sales volume of an item or product in accordance with an embodiment of the present invention.
Figure 4:
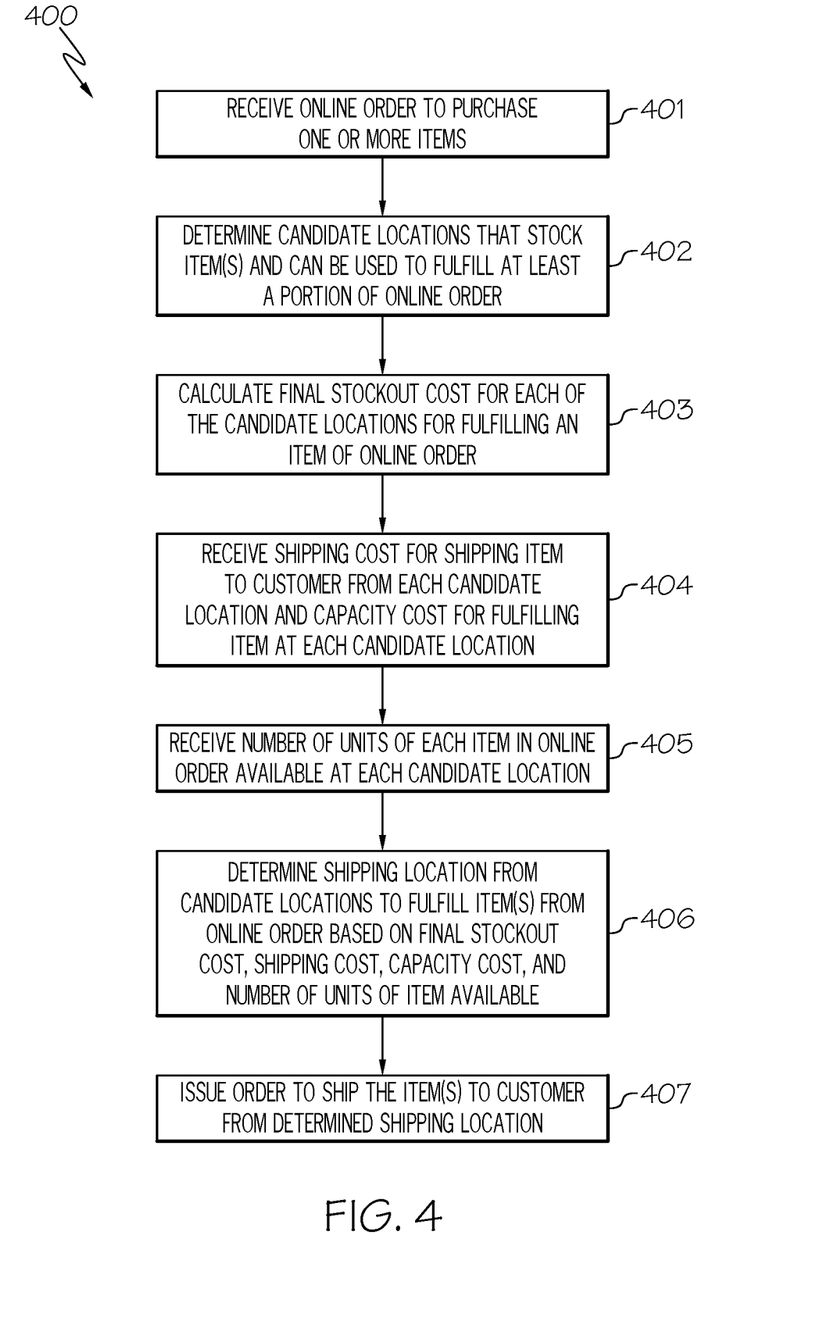
FIG. 4 is a flowchart of a method for fulfilling an online order utilizing both distribution centers and store inventories in accordance with an embodiment of the present invention.
Figure 5:
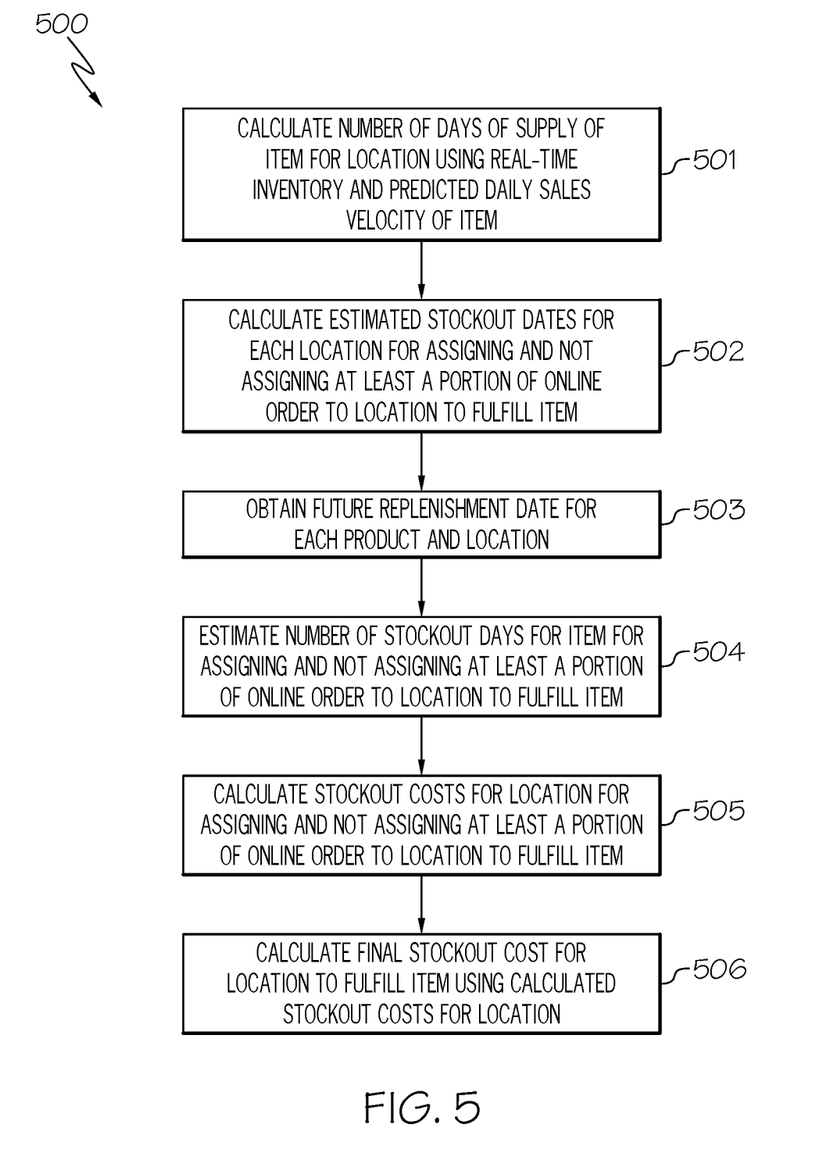
FIG. 5 is a flowchart of a method for calculating the stockout cost for a location to fulfill an item in accordance with an embodiment of the present invention.

The embodiments of the present invention provide a means for avoiding stockouts by efficiently fulfilling online orders utilizing both distribution centers and store inventories as discussed below in connection with FIGS. 3-5. FIG. 3 is a flowchart of a method for creating a model for predicating the daily sales volume of an item or product (e.g., Paw Patrol® lunch box). FIG. 4 is a flowchart of a method for fulfilling an online order utilizing both distribution centers and store inventories. FIG. 5 is a flowchart of a method for calculating the stockout cost for a location to fulfill an item.

As stated above, FIG. 3 is a flowchart of a method 300 for creating a model (statistical model) for predicating the daily sales volume of an item or product in accordance with an embodiment of the present invention.

Referring to FIG. 3, in conjunction with FIGS. 1-2, in step 301, online order analyzer 104 receives historical data from data sources pertaining to the daily sales velocity of items. The "daily sales velocity of an item," as used herein, refers to how quickly an item is being sold, such as from a particular location (e.g., retail store 106A).

For example, a period of three to six months of historical data is received from the following input files: (1) product, store, date, units, and price data is received from the Point of Sale (POS); (2) product, store, date, and inventory data is received from the inventory; (3) product, cost, description, department and brand data is received from the product file; (4) product, store, future replenishment date, and replenishment quantity are received from the replenishment file (used to indicate how quickly the stock or supply of an item can restored to a former level or condition); and (5) product, store, date, orderID and quantity from the online order. Such files may be retrieved from the computing devices of distribution center 105/retail stores 106 or database 108 or may be directly inputted via an administrator with knowledge of such files.

In one embodiment, online order analyzer 104 reads such data and then combines and stores all the data into a file, where each row represents a product, location and day combination. Afterwards, such data (product, location and day combination) is used to determine the features that are used as input for the predictive model.

In step 302, online order analyzer 104 calculates the model input features from the received historical data as discussed above.

In step 303, online order analyzer 104 creates the model (statistical model) for predicting the daily sales velocity for product and location combinations.

In one embodiment, the statistical model is created using gradient-boosted trees. In another embodiment, the statistical model is created using regression. In one embodiment, the model is estimated for all product and location combinations and the parameters of this model are saved for later use. In one embodiment, the model is estimated monthly, but the model input features are updated daily. Every day, new data files (e.g., inventory, product, purchase order which consists of order lines, replenishment) are read and used to update the input features for the model. With this daily process, a new updated daily prediction can be computed every day for each product and location. Other variables, such as the future replenishment date as well as the product price and cost, are also updated every day using the daily data input files and they serve as inputs for the stockout cost calculation discussed below in connection with FIGS. 4-5.

FIG. 4 is a flowchart of a method 400 for fulfilling an online order utilizing both distribution centers and store inventories in accordance with an embodiment of the present invention.

Referring to FIG. 4, in conjunction with FIGS. 1-3, in step 401, online order analyzer 104 receives an online order to purchase one or more items (e.g., a pack of eighteen tennis balls). For example, user 101 may have issued an online order to purchase an item with web server 102, which then sends the online order to online order analyzer 104 to be analyzed.

In step 402, online order analyzer 104 determines "candidate locations" that stock the item(s) of the online order and that can be used to fulfill at least a portion of the online order. As used herein, "candidate locations," refers to locations (distribution centers 105, retail stores 106) that stock the item(s) of the online order and that can be used to fulfill at least a portion of the online order. In one embodiment, online order analyzer 104 has access to database 108 that stores the physical location of distribution centers 105 and retail stores 106 as well as the list of items that are currently being sold in such locations (real-time inventory). Such information may be used by online order analyzer 104 to determine which locations stock the item(s) of the online order as well as which ones can be used to fulfill at least a portion of the online order based on the physical location of distribution centers 105/retail stores 106 with respect to the location of the customer, which may be directly provided by the customer (via computing device 101) or deduced via the Internet Protocol (IP) address of computing device 101 utilized by the customer.

In step 403, online order analyzer 104 calculates a final stockout cost for each of the candidate locations for fulfilling an item of the online order.

In one embodiment, the "final stockout cost" for each of the candidate locations for fulfilling an item of the online order is calculated using the method of FIG. 5.

FIG. 5 is a flowchart of a method 500 for calculating the stockout cost for a location to fulfill an item in accordance with an embodiment of the present invention.

The stockout cost represents the amount of money lost due to an inventory shortage for a given product and location. This stockout cost is a function of the available inventory, the next replenishment date, the predicted daily velocity (discussed above in connection with FIG. 3) and the price and cost of the product. In the context of the online order fulfillment system, the stockout cost used by online order analyzer 104 is specific to the candidate location for fulfillment and it represents the difference in the stockout cost for two different scenarios, namely, when the product is assigned or not assigned to the location to be fulfilled, as discussed further below.

Referring now to FIG. 5, in conjunction with FIGS. 1-4, in step 501, online order analyzer 104 calculates the number of days of supply of the item (e.g., Paw Patrol® pen) for a location (e.g., retail store 106A) using real-time inventory and the predicted daily sales velocity of the item (see FIG. 3). As previously discussed, the real-time inventory may be acquired by online order analyzer 104 via database 108 storing the list of items that are currently being sold in the location. Also, as discussed above, online order analyzer 104 creates a model to predict the daily sales velocity of the item at the location as discussed above in connection with FIG. 3.

In one embodiment, the decision of assigning or not assigning an item(s) of the online order to a particular location to be fulfilled is based on the impact of the assignment on the stockout cost. As a result, the number of days of supply (DOS) is calculated for both assumptions of assigning or not assigning an item(s) of the online order to the location to be fulfilled. For example, $$DOSIfAssigned = (AvailableInventory - QuantityAssigned)/dailyVelocity$$

$$DOSIfNotAssigned = AvailableInventory/dailyVelocity$$

where "DOSIfAssigned" refers to the days of supply of the item if the item is assigned to the location to be fulfilled, "DOSIfNotAssigned" refers to the days of supply of the item if the item is not assigned to the location to be fulfilled, "AvailableInventory" refers to the quantity of the item available at the location, "QuantityAssigned" refers to the quantity of the item to be fulfilled and "dailyVelocity" refers to the daily sales volume of the item at the location as discussed above.

In step 502, online order analyzer 104 calculates the estimated stockout dates for each location for assigning and not assigning at least a portion of the online order to the location to fulfill the item. For example, $$StockoutDateIfAssigned = OrderSourcingDate + DOSIfAssigned$$

$$StockoutDateIfNotAssigned = OrderSourcingDate + DOSIfNotAssigned$$

where "StockoutDateIfAssigned" refers to the stockout date of the item if the item is assigned to the location to be fulfilled, "StockoutDateIfNotAssigned" refers to the stockout date of the item if the item is not assigned to the location to be fulfilled, and "OrderSourcingDate" refers to the date in which the online order was placed by user 101.

In step 503, online order analyzer 104 obtains the future replenishment date for each product and location. In one embodiment, the future replenishment date is obtained by the customer. If, however, the future replenishment date is not provided by the customer, then it may be estimated using the number of days of supply and a default lead time value for the replenishment.

In step 504, online order analyzer 104 estimates the number of stockout days for the item at the location for assigning and not assigning at least a portion of the online order to the location to fulfill the item. If the stockout date is after the replenishment date, then there will be no stockout so the stockout cost is zero. If the stockout date is before the replenishment date, then the number of days that the stockout is going to last (before replenishment arrives) needs to be calculated. For example, StockoutDaysIfAssigned=Days between replenishment date and StockoutDateIfAssigned StockoutDaysIfNotAssigned=Days between replenishment date and StockoutDateIfNotAssigned where "StockoutDaysIfAssigned" refers to the number of stockout days for the item at the location if the item is assigned to the location to be fulfilled, "StockoutDaysIfNotAssigned" refers to the number of stockout days for the item at the location if the item is not assigned to the location to be fulfilled In step 505, online order analyzer 104 calculates the stockout costs for the location for assigning and not assigning at least a portion of the online order to the location to fulfill the item. For example, StockoutCostIfAssigned=StockoutDaysIfAssigned*DailyVelocity*Price StockoutCostIfNotAssigned=StockoutDaysIfNotAssigned*DailyVelocity*Price where "StockoutCostifAssigned" refers to the stockout cost for the location if the item is assigned to the location to be fulfilled, "StockoutCostifNotAssigned" refers to the stockout cost for the location if the item is not assigned to the location to be fulfilled, and "Price" refers to the price of the item.

In step 506, online order analyzer 104 calculates the final stockout cost for the location to fulfill the item using the calculated stockout costs (see step 505) for the location. For example, the final stockout cost ("FinalStockoutCost") is calculated as the stockout cost if the quantity is assigned to the location minus the stockout cost if the quantity is not assigned to the location. For instance, FinalStockoutCost=(StockoutCostifAssigned−StockoutCostIfNotAssigned)

The final estimated stockout cost is used as an input by online order analyzer 104 to derive an optimal assignment of each online order minimizing not only the stockout cost but also all the other related costs, such as shipping cost and capacity cost. The stockout cost is calculated at real-time by online order analyzer 104. In one embodiment, another input utilized by online order analyzer 104 is the number of units available at real-time at each location carrying the different products that are part of the online order. For each product, the inventory level is a factor in determining whether or not a positive stockout cost will be associated with the allocation of the online order to the location.

Returning to FIG. 4, in conjunction with FIGS. 1-3 and 5, in step 404, online order analyzer 104 receives the shipping cost for shipping the item to customer 101 from each candidate location and receives the capacity cost for fulfilling the item at each candidate location. In one embodiment, the shipping cost may be obtained based on the distance between the location of customer 101 and the candidate location. For example, database 108 may store a table used for associating a shipping cost with a distance, such as a distance between customer 101 and a candidate location. Furthermore, "capacity cost," as used herein, refers to an expense incurred by the business in order to provide for or increase its ability to conduct business operations. Such a cost may be closely related to consumer demand. If, for example, a distribution center is experiencing a period of high volume due to increased sales productivity, they might add additional workers or additional shifts to keep up with the high demand. These increases in personnel are also capacity costs as they allow the business to increase its production capacity. Once the high volume period passes, the company can scale back on personnel to reduce their costs. In one embodiment, such capacity costs are provided to online order analyzer 104 directly by the business.

In step 405, online order analyzer 104 receives the number of units of each item in the online order available at each candidate location, such as in real-time via a real-time inventory. In one embodiment, each location may contain a database storing real-time information pertaining to the inventory of items that are currently available to be sold by the location. Such information may be provided to online order analyzer 104 from the locations to determine the number of units of each item in the online order available at each candidate location. In one embodiment, such information is stored in database 108.

In step 406, online order analyzer 104 determines the shipping location from the candidate locations to fulfill the item(s) from the online order based on the final stockout cost, the shipping cost, the capacity cost, and the number of units of the item available. For example, the higher the final stockout cost, the less likely to ship the item(s) from the location associated with that final stockout cost. Similarly, the higher the shipping cost or capacity, the less likely to ship the item(s) from the location associated with those costs. In another example, the fewer the number of units of the item available, the less likely to ship the item(s) from that location. Conversely, the lower the final stockout cost, the more likely to ship the item(s) from the location associated with that final stockout cost. Similarly, the lower the shipping cost or capacity, the more likely to ship the item(s) from the location associated with those costs. In another example, the greater the number of units of the item available, the more likely to ship the item(s) from that location.

In this manner, by utilizing the stockout cost, online orders may be optimally routed to either distribution centers or physical stores for fulfillment so as to minimize or avoid product stockouts. Product stockouts are minimized or avoided due to the fact that stockout cost (representing the amount of money lost due to an inventory shortage for a given product and location) is taken into consideration in determining whether a distribution center or a physical store should fulfill that item(s) of the online order.

An exemplary illustration of online order analyzer 104 using the final stockout cost and other factors to determine the shipping location from the candidate locations to fulfill the item(s) from the online order is provided below.

It is noted for clarity that in certain situations, multiple shipping locations may be selected from the candidate locations to ship different items of the online order to the customer.

In step 407, online order analyzer 104 issues an order (e.g., instruction, command) to ship the item(s) to customer 101 from the determined shipping location.

An exemplary illustration for determining which location(s) to fulfill the item(s) from the online order is provided below.

Suppose that an online order consists of five units for a particular product A. This product A is available in only two locations with the following inventory:

Location #1: inventory=3

Location #2: inventory=4

In this example, there are only 3 possible scenarios to fulfill this order.

1) Assign 3 units to be fulfilled at location #1 and 2 units to be fulfilled at location #2

2) Assign 2 units to be fulfilled at location #1 and 3 units to be fulfilled at location #2

3) Assign 1 unit to be fulfilled at location #1 and 4 units to be fulfilled at location #2

In this example, it is assumed that the statistical model predicted the following daily velocity values:

Location #1: predictedVelocity=1.5 units

Location #2: predictedVelocity=2 units

Furthermore, in this example, it is assumed that the price of the product is $20, its cost is $10 and today is Jan. 25, 2017. Replenishment is already scheduled to arrive in 1 day (Jan. 26, 2017) for location #1 but not scheduled yet for location #2. Additionally, it is assumed that replenishment will be ordered only when the stockout happens in location #2 and that it will take two days for the replenishment to actually arrive (lead days). Given these assumptions, the future replenishment date for location #2 would be:

DaysUntilReplenishment=(DOS+LeadDays)=(inventory/velocity)+LeadDays=(4/2)+2=4

ReplenishmentDate=Jan. 25,2017+4 days=Jan. 29,2017

The input to online order analyzer 104 represents all possible quantities for each location such as shown below:
{product, location, inventory, quantityAssigned, predictedVelocity, price, cost, orderDate, ReplenishmentDate}
{A, 1, 3, 3, 1.5, 20, 10, 01/25/17, 01/26/17}
{A, 1, 3, 2, 1.5, 20, 10, 01/25/17, 01/26/17}
{A, 1, 3, 1, 1.5, 20, 10, 01/25/17, 01/26/17}
{A, 2, 4, 2, 2, 20, 10, 01/25/17, 01/29/17}
{A, 2, 4, 3, 2, 20, 10, 01/25/17, 01/29/17}
{A, 2, 4, 4, 2, 20, 10, 01/25/17, 01/29/17}

Assuming that the quantity in the input array is assigned to the location, the DOS defined as (inventoryquantityAssigned)/velocity and the corresponding stockout date for each possible input combination are:

{A, 1, 3, 3} DOSIfAssigned=(3−3)/1.5=0 (stockout happens today right after the order is assigned)

{A, 1, 3, 2} DOSIfAssigned=(3−2)/1.5=0.667 (stockout happens later today)

{A, 1, 3, 1} DOSIfAssigned=(3−1)/1.5=1.333 (stockout happens some time tomorrow)

{A, 2, 4, 2} DOSIfAssigned=(4−2)/2=1 (stockout happens tomorrow)

{A, 2, 4, 3} DOSIfAssigned=(4−3)/2=0.5 (stockout happens later today)

{A, 2, 4, 4} DOSIfAssigned=(4−4)/2=0 (stockout happens today right after the order is assigned)

Given the fact that replenishment is already scheduled to arrive tomorrow for location #1, the stockout will happen only if two or three units are assigned from this location. No stockout will happen if only one unit is assigned to location #1 so the stockout cost is zero in this case. For location #2, all combinations will eventually lead to a stockout because replenishment will be ordered only when inventory=0 so stockout is inevitable in this case. The number of days that the product will be on stockout for location #2 will always be 2.

The number of stockout days is represented by the number of lead days when replenishment is based on inventory and it is calculated as (DaysUntilReplenishment−DOSIfAssigned) when replenishment is already scheduled. Using these definitions, the number of stockout days for each location becomes:

For location #1,StockoutDaysIfAssigned=(DaysUntilReplenishment−DOSIfAssigned) where DaysUntilReplenishment=(ReplenishmentDate−OrderSourcingDate)=Jan. 26,2017−Jan. 25,2017=1 day For location #2,StockoutDaysIfAssigned=LeadDays=2 days The stockout cost if the quantity is assigned from the location is calculated using this equation:

StockoutCostIfAssigned=StockoutDaysIfAssigned*DailyVelocity*(Price−Cost)

Each combination then gets the following calculation:

{A,1,3,3} StockoutCostIfAssigned=(1−0)*1.5*($20−$10)=$15

{A,1,3,2} StockoutCostIfAssigned=(1−0.667)*1.5*($20−$10)=$5

{A,1,3,1} StockoutCostIfAssigned=$0 (because there is no stockout)

{A,2,4,2} StockoutCostIfAssigned=2*2*($20−$10)=$40

{A,2,4,3} StockoutCostIfAssigned=2*2*($20−$10)=$40

{A,2,4,4} StockoutCostIfAssigned=2*2*($20−$10)=$40

The stockout cost needs to be compared with the cost if the quantity is not assigned to this location. If the quantity is not assigned, then the DOS and stockout date are calculated as:

{A,1,3,3} DOSIfNotAssigned=(3−0)/1.5=2 (2 DOS and replenishment is tomorrow so no stockout)

{A,1,3,2} DOSIfNotAssigned=(3−0)/1.5=2 (2 DOS and replenishment is tomorrow so no stockout)

{A,1,3,1} DOSIfNotAssigned=(3−0)/1.5=2 (2 DOS and replenishment is tomorrow so no stockout)

{A,2,4,2} DOSIfNotAssigned=(4−0)/2=2 (stockout happens in 2 days)

{A,2,4,3} DOSIfNotAssigned=(4−0)/2=2 (stockout happens in 2 days)

{A,2,4,4} DOSIfNotAssigned=(4−0)/2=2 (stockout happens in 2 days)

The stockout cost if the quantity is not assigned to this location is calculated as follows:

StockoutCostIfNotAssigned=StockoutDaysIfNotAssigned*DailyVelocity*Price where StockoutDaysIfNotAssigned=0 for location #1 and StockoutDaysIfNotAssigned=Days between replenishment order and arrival date=2 for location #2

{A,1,3,3} StockoutCostIfNotAssigned=$0 (because there is no stockout)

{A,1,3,2} StockoutCostIfNotAssigned=$0 (because there is no stockout)

{A,1,3,1} StockoutCostIfNotAssigned=$0 (because there is no stockout)

{A,2,4,2} StockoutCostIfNotAssigned=2*2*$10=$40

{A,2,4,3} StockoutCostIfNotAssigned=2*2*$10=$40

{A,2,4,4} StockoutCostIfNotAssigned=2*2*$10=$40

The final stockout cost represents the dollar amount one would lose (cost) for each scenario.

Final StockoutCost=(StockoutCostIfAssigned−StockoutCostIfNotAssigned)

{A,1,3,3} (15−0)=15

{A,1,3,2} (5−0)=5

{A,1,3,1} (0−0)=0

{A,2,4,2} (40−40)=0

{A,2,4,3} (40−40)=0

{A,2,4,4} (40−40)=0

The final output sent to be optimized by online order analyzer 104 may appear as follows:
{product, location, quantityAssigned, stockoutCost}
{A, 1, 3, 15}
{A, 1, 2, 5}
{A, 1, 1, 0}
{A, 2, 2, 0}
{A, 2, 3, 0}
{A, 2, 4, 0}

It is the final stockout cost values that online order analyzer 140 will use along with all the other costs (e.g., shipping, capacity) to select the best location for each order.

The purpose of online order analyzer 104 is to process the online order information at real-time and quickly come up with the optimal assignment that will minimize all the costs for each order. The optimization will take into account several factors, such as:

1) shipping cost: depends on factors, such as the quantity of the item assigned, number of days to deliver, carrier, carrier mode, distance, origin of destination of the package, weight of the package, number of items in each package, number of packages, etc. Penalties can be added to the cost for delays or packages that exceed a specific weight.

2) capacity cost: depends on the number of orders that each location can handle at any given day. Penalties can be added to the cost if the number of orders exceeds the capacity.

3) stockout cost: depends on the predicted number of stockout days based on the velocity model and the next replenishment date.

The optimization performed by online order analyzer 104 is a real-time process that is invoked whenever an online customer (e.g., user of computing device 101) proceeds with the purchase of online items, such as from web server 102. The different costs are calculated for each location (e.g., retail store 106A) that is a candidate for the assignment of the online order. A candidate location is identified when one or more items that are part of the online order are on stock at the location. Online order analyzer 104 will derive an optimal solution that will minimize all the costs, including the stockout cost. The final solution for each order includes the number of packages at each selected location, the carrier, the carrier mode and the number of items associated with each package.

Embodiments of the present invention are designed to minimize the stockout impact by optimally routing online orders to either distribution centers or physical stores for fulfillment. In one embodiment, the present invention uses a set of statistical models to predict the daily sales velocity of the item and estimate the expected number of stockout days before the next replenishment date. The estimated number of stockout days is then converted into a cost that represents the amount of money lost because of the assignment of an online order to a specific location. These lost sales are then considered in an optimization problem that is designed to optimally allocate orders based on a set of objectives and constraints that the seller has identified for that product.

Furthermore, the present invention improves the technology or technical field involving order fulfillment. As discussed above, there is not currently a means for avoiding stockouts in connection with fulfilling online orders utilizing both distribution centers and store inventories. Embodiments of the present invention improves such technology by utilizing a stockout cost (representing the amount of money lost due to an inventory shortage for a given product and location) in determining whether a distribution center or a physical store should fulfill that item(s) of the online order. In particular, embodiments of the present invention incorporate a forecasting model to predict the daily sales velocity of the item. Furthermore, a stockout cost is calculated based in part on the predicted daily sales velocity of the item. Using such a stockout cost as discussed above, the online order sourcing plans can be optimized to avoid inventory shortage events.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for fulfilling an online order, the method comprising:
receiving said online order to purchase one or more items;
determining candidate locations that stock one or more of said one or more items and can be used for fulfill at least a portion of said online order, wherein at least one of said candidate locations comprises a retail store;
calculating a stockout cost for each of said candidate locations for fulfilling an item of said online order, wherein said stockout cost is a cost of a potential lost sale of said item of said online order by said candidate location if said candidate location fulfills said item of said online order, wherein said stockout cost for said candidate location represents a difference in a stockout cost for two different scenarios, namely, when a product is assigned or not assigned to said candidate location to be fulfilled;
determining a shipping location among said candidate locations to fulfill said item of said online order based at least in part on said stockout cost for each of said candidate locations for fulfilling said item of said online order; and
issuing an order to ship said item to a customer from said determined shipping location.

2. The method as recited in claim 1 further comprising:
receiving a shipping cost for shipping said item to said customer from each of said candidate locations;
receiving a capacity cost for fulfilling said item from each of said candidate locations;
receiving a number of units of each item of said online order available at each of said candidate locations; and
determining said shipping location among said candidate locations to fulfill said item of said online order based on said stockout cost for each of said candidate locations for fulfilling said item of said online order, said shipping cost for shipping said item to said customer from each of said candidate locations, said capacity cost for fulfilling said item from each of said candidate locations and said number of units of each item of said online order available at each of said candidate locations.

3. The method as recited in claim 1, wherein said stockout cost is based at least in part on a likelihood that said candidate location would make a future sale of said item.

4. The method as recited in claim 1 further comprising:
receiving historical data from data sources pertaining to daily sales velocity of items;
calculating model input features from said received historical data; and
creating a model for predicating daily sales velocity for product and location combinations.

5. The method as recited in claim 4 further comprising:
calculating number of days of supply of said item from each of said candidate locations using real-time inventory and said predicated daily sales velocity of said item;
calculating for each of said candidate locations a first and a second estimated stockout date for assigning and not assigning, respectively, at least a portion of said online order to said candidate location to fulfill said item using said calculated number of days of supply of said item;
obtaining a future replenishment date for each product and each of said candidate locations;
estimating a first and a second number of stockout days for said item for assigning and not assigning, respectively, at least a portion of said online order to said candidate location to fulfill said item using said obtained future replenishment date;
calculating a first and a second stockout cost for each of said candidate locations for assigning and not assigning, respectively, at least a portion of said online order to said candidate location to fulfill said item using said first and second number of stockout days, said predicted daily sales velocity of said item and a price; and
calculating said stockout cost for each of said candidate locations for fulfilling said item of said online order using said calculated first and stock stockout costs.

6. The method as recited in claim 1, wherein said stockout cost is a function of available inventory of said item, next replenishment date of said item, predicted daily sales velocity of said item, a price of said item and a cost of said item.

7. The method as recited in claim 1, wherein at least one of said candidate locations comprises a distribution center.

8. A computer program product for fulfilling an online order, the computer program product comprising a computer readable storage medium having program code embodied therewith, the program code comprising the programming instructions for:
receiving said online order to purchase one or more items;
determining candidate locations that stock one or more of said one or more items and can be used for fulfill at least a portion of said online order, wherein at least one of said candidate locations comprises a retail store;
calculating a stockout cost for each of said candidate locations for fulfilling an item of said online order, wherein said stockout cost is a cost of a potential lost sale of said item of said online order by said candidate location if said candidate location fulfills said item of said online order, wherein said stockout cost for said candidate location represents a difference in a stockout cost for two different scenarios, namely, when a product is assigned or not assigned to said candidate location to be fulfilled;
determining a shipping location among said candidate locations to fulfill said item of said online order based at least in part on said stockout cost for each of said candidate locations for fulfilling said item of said online order; and
issuing an order to ship said item to a customer from said determined shipping location.

9. The computer program product as recited in claim 8, wherein the program code further comprises the programming instructions for:
receiving a shipping cost for shipping said item to said customer from each of said candidate locations;
receiving a capacity cost for fulfilling said item from each of said candidate locations;
receiving a number of units of each item of said online order available at each of said candidate locations; and
determining said shipping location among said candidate locations to fulfill said item of said online order based on said stockout cost for each of said candidate locations for fulfilling said item of said online order, said shipping cost for shipping said item to said customer from each of said candidate locations, said capacity cost for fulfilling said item from each of said candidate locations and said number of units of each item of said online order available at each of said candidate locations.

10. The computer program product as recited in claim 8, wherein said stockout cost is based at least in part on a likelihood that said candidate location would make a future sale of said item.

11. The computer program product as recited in claim 8, wherein the program code further comprises the programming instructions for:
receiving historical data from data sources pertaining to daily sales velocity of items;
calculating model input features from said received historical data; and
creating a model for predicating daily sales velocity for product and location combinations.

12. The computer program product as recited in claim 11, wherein the program code further comprises the programming instructions for:
calculating number of days of supply of said item from each of said candidate locations using real-time inventory and said predicated daily sales velocity of said item;
calculating for each of said candidate locations a first and a second estimated stockout date for assigning and not assigning, respectively, at least a portion of said online order to said candidate location to fulfill said item using said calculated number of days of supply of said item;
obtaining a future replenishment date for each product and each of said candidate locations;
estimating a first and a second number of stockout days for said item for assigning and not assigning, respectively, at least a portion of said online order to said candidate location to fulfill said item using said obtained future replenishment date;

calculating a first and a second stockout cost for each of said candidate locations for assigning and not assigning, respectively, at least a portion of said online order to said candidate location to fulfill said item using said first and second number of stockout days, said predicted daily sales velocity of said item and a price; and calculating said stockout cost for each of said candidate locations for fulfilling said item of said online order using said calculated first and stock stockout costs.

13. The computer program product as recited in claim 8, wherein said stockout cost is a function of available inventory of said item, next replenishment date of said item, predicted daily sales velocity of said item, a price of said item and a cost of said item.

14. The computer program product as recited in claim 8, wherein at least one of said candidate locations comprises a distribution center.

15. A system, comprising:
a memory for storing a computer program for fulfilling an online order; and
a processor connected to said memory, wherein said processor is configured to execute the program instructions of the computer program comprising:
  receiving said online order to purchase one or more items;
  determining candidate locations that stock one or more of said one or more items and can be used for fulfill at least a portion of said online order, wherein at least one of said candidate locations comprises a retail store;
  calculating a stockout cost for each of said candidate locations for fulfilling an item of said online order, wherein said stockout cost is a cost of a potential lost sale of said item of said online order by said candidate location if said candidate location fulfills said item of said online order, wherein said stockout cost for said candidate location represents a difference in a stockout cost for two different scenarios, namely, when a product is assigned or not assigned to said candidate location to be fulfilled;
  determining a shipping location among said candidate locations to fulfill said item of said online order based at least in part on said stockout cost for each of said candidate locations for fulfilling said item of said online order; and
  issuing an order to ship said item to a customer from said determined shipping location.

16. The system as recited in claim 15, wherein the program instructions of the computer program further comprise:
  receiving a shipping cost for shipping said item to said customer from each of said candidate locations;
  receiving a capacity cost for fulfilling said item from each of said candidate locations;
  receiving a number of units of each item of said online order available at each of said candidate locations; and
  determining said shipping location among said candidate locations to fulfill said item of said online order based on said stockout cost for each of said candidate locations for fulfilling said item of said online order, said shipping cost for shipping said item to said customer from each of said candidate locations, said capacity cost for fulfilling said item from each of said candidate locations and said number of units of each item of said online order available at each of said candidate locations.

17. The system as recited in claim 15, wherein said stockout cost is based at least in part on a likelihood that said candidate location would make a future sale of said item.

18. The system as recited in claim 15, wherein the program instructions of the computer program further comprise:
  receiving historical data from data sources pertaining to daily sales velocity of items;
  calculating model input features from said received historical data; and
  creating a model for predicating daily sales velocity for product and location combinations.

19. The system as recited in claim 18, wherein the program instructions of the computer program further comprise:
  calculating number of days of supply of said item from each of said candidate locations using real-time inventory and said predicated daily sales velocity of said item;
  calculating for each of said candidate locations a first and a second estimated stockout date for assigning and not assigning, respectively, at least a portion of said online order to said candidate location to fulfill said item using said calculated number of days of supply of said item;
  obtaining a future replenishment date for each product and each of said candidate locations;
  estimating a first and a second number of stockout days for said item for assigning and not assigning, respectively, at least a portion of said online order to said candidate location to fulfill said item using said obtained future replenishment date;
  calculating a first and a second stockout cost for each of said candidate locations for assigning and not assigning, respectively, at least a portion of said online order to said candidate location to fulfill said item using said first and second number of stockout days, said predicted daily sales velocity of said item and a price; and
  calculating said stockout cost for each of said candidate locations for fulfilling said item of said online order using said calculated first and stock stockout costs.

20. The system as recited in claim 15, wherein said stockout cost is a function of available inventory of said item, next replenishment date of said item, predicted daily sales velocity of said item, a price of said item and a cost of said item.

* * * * *